(12) United States Patent
Fujishima et al.

(10) Patent No.: US 6,829,614 B2
(45) Date of Patent: Dec. 7, 2004

(54) SCRAMBLING METHOD OF THE DATA FILES

(75) Inventors: Yuzo Fujishima, Tokyo (JP); Jean-Jacques Dubray, Littleton, MA (US); David Alan Wiedmer, Littleton, MA (US); Takashi Kojo, Littleton, MA (US)

(73) Assignees: NEC Corporation, Tokyo (JP); NEC Systems, Inc., Littleton, MA (US)

(*) Notice: Subject to any disclaimer, the term of this patent is extended or adjusted under 35 U.S.C. 154(b) by 0 days.

(21) Appl. No.: 09/409,440

(22) Filed: Sep. 30, 1999

(65) Prior Publication Data

US 2003/0014413 A1 Jan. 16, 2003

(51) Int. Cl.[7] ............................. G06F 7/00; G06F 17/30
(52) U.S. Cl. ......................................... 707/101; 707/10
(58) Field of Search ........................ 379/88.13, 88.17, 379/88.22; 707/10–104.1, 500–513, 1–9; 370/60, 392, 324, 349; 717/140–147; 713/100, 155; 714/798; 709/220–223

(56) References Cited

U.S. PATENT DOCUMENTS 6,263,051 B1 * 7/2001 Saylor et al. ............ 379/88.17
6,557,043 B1 * 4/2003 Fletcher ...................... 709/231

* cited by examiner

Primary Examiner—Uyen Le
Assistant Examiner—Te Yu Chen
(74) Attorney, Agent, or Firm—Foley & Lardner LLP

(57) ABSTRACT

The data scrambler converts the original data files into the converted data files, respectively, while keeping the output produced by the receiver unchanged. The conversion may comprise dummy insertion, logical structure changing, tag name changing, element order changing, and value unit changing. If the input data files are XML and XSL files, each step also produces XML and XSL files. However, the produced files contain different data from the input XML and XSL files.

25 Claims, 16 Drawing Sheets

```
<USER>
   <ADDR>Tokyo</ADDR>
   <NAME>Takahashi</NAME>
</USER>
<USER>
   <ADDR>Osaka</ADDR>
   <NAME>Yamada</NAME>
</USER>
```
XML FILE

```
<xsl:template match="USER">
  <fo:inline-sequence font-size="12pt">
   <xsl:value-of select="NAME">
  </fo:inline-sequence>
  <fo:inline-sequence font-size="10pt">
   <xsl:value-of select="ADDR">
  </fo:inline-sequence>
</xsl:template>
```
XSL FILE

FIG. 7

```
<USER>
   <NAME>Takahashi</NAME>
   <ADDR>Tokyo</ADDR>
</USER>
<USER>
   <NAME>Yamada</NAME>
   <ADDR>Osaka</ADDR>
</USER>
```

XML FILE

```
<xsl:template match="USER/NAME">
   <fo:inline-sequence font-size="12pt">...
<xsl:template match="USER/ADDR">
   <fo:inline-sequence font-size="10pt">...
```

XSL FILE

FIG. 9

```
<USER>
   <NAME>Taka<DM1>has</DM1>hi</NAME>
   <ADDR><DM2>Toky</DM2>o</ADDR>
</USER>
<USER>
   <NAME><DM3>Yam</DM3>ada</NAME>
   <ADDR><DM4>Os</DM4>aka</ADDR>
</USER>
```
                                                   XML FILE

```
<xsl:template match="USER/NAME">
   <fo:inline-sequence font-size="12pt">...
<xsl:template match="USER/ADDR">
   <fo:inline-sequence font-size="10pt">...
<xsl:template match="USER/NAME/DM1">
   <fo:inline-sequence font-size="12pt">...
<xsl:template match="USER/ADDR/DM2">
   <fo:inline-sequence font-size="10pt">...
<xsl:template match="USER/NAME/DM3">
   <fo:inline-sequence font-size="12pt">...
<xsl:template match="USER/ADDR/DM4">
   <fo:inline-sequence font-size="10pt">...
```
                                                   XSL FILE

FIG. 10

```
<USER_NAME_1>Taka</USER_NAME_1>
<USER_NAME_DM1_2>has</USER_NAME_DM1_2>
<USER_NAME_3>hi</USER_NAME_3>
<USER_ADDRESS_DM2_4>Toky</USER_ADDR_DM2_4>
<USER_ADDRESS_5>o<USER_ADDR_5>
<USER_NAME_DM3_6>Yam</USER_NAME_DM3_6>
<USER_NAME_7>ada</USER_NAME_7>
<USER_ADDRESS_DM4_8>Os</USER_ADDR_DM4_8>
<USER_ADDRESS_9>aka</USER_ADDR_9>
```
XML FILE

```
<xsl:template match="USER_NAME_1">
   <fo:inline-sequence font-size="12pt">...
<xsl:template match="USER_NAME_DM1_2">
   <fo:inline-sequence font-size="12pt">...
<xsl:template match="USER_NAME_3">
   <fo:inline-sequence font-size="12pt">...
<xsl:template match="USER_ADDR_DM2_4">
   <fo:inline-sequence font-size="10pt">...
<xsl:template match="USER_ADDR_5">
   <fo:inline-sequence font-size="10pt">...
<xsl:template match="USER_NAME_DM3_6">
   <fo:inline-sequence font-size="12pt">...
<xsl:template match="USER_NAME_7">
   <fo:inline-sequence font-size="12pt">...
<xsl:template match="USER_ADDR_DM4_8">
   <fo:inline-sequence font-size="10pt">...
<xsl:template match="USER_ADDR_9">
   <fo:inline-sequence font-size="10pt">...
```
XSL FILE

FIG. 11

```
<DF>Taka</DF>
<XS>has</XS>
<KQ>hi</KQ>
<WW>Toky</WW>
<GX>o</GX>
<AV>Yam</AV>
<JR>ada</JR>
<CJ>Os</CJ>
<YE>aka</YE>
```
XML FILE

```
<xsl:template match="DF">
   <fo:inline-sequence font-size="12pt">...
<xsl:template match="XS">
   <fo:inline-sequence font-size="12pt">...
<xsl:template match="KQ">
   <fo:inline-sequence font-size="12pt">...
<xsl:template match="WW">
   <fo:inline-sequence font-size="10pt">...
<xsl:template match="GX">
   <fo:inline-sequence font-size="10pt">...
<xsl:template match="AV">
   <fo:inline-sequence font-size="12pt">...
<xsl:template match="JR">
   <fo:inline-sequence font-size="12pt">...
<xsl:template match="CJ">
   <fo:inline-sequence font-size="10pt">...
<xsl:template match="YE">
   <fo:inline-sequence font-size="10pt">...
```
XSL FILE

FIG. 12

```
<xsl:template match="CJ">
  <fo:inline-sequence font-size="10pt">...
<xsl:template match="KQ">
  <fo:inline-sequence font-size="12pt">...
<xsl:template match="GX">
  <fo:inline-sequence font-size="10pt">...
<xsl:template match="YE">
  <fo:inline-sequence font-size="10pt">...
<xsl:template match="AV">
  <fo:inline-sequence font-size="12pt">...
<xsl:template match="XS">
  <fo:inline-sequence font-size="12pt">...
<xsl:template match="DF">
  <fo:inline-sequence font-size="12pt">...
<xsl:template match="JR">
  <fo:inline-sequence font-size="12pt">...
<xsl:template match="WW">
  <fo:inline-sequence font-size="10pt">...
```

XSL FILE

FIG. 13

```
<xsl:template match="CJ">
  <fo:inline-sequence font-size="0.17inch">...
<xsl:template match="KQ">
  <fo:inline-sequence font-size="4.2mm">...
<xsl:template match="GX">
  <fo:inline-sequence font-size="3.5mm">...
<xsl:template match="YE">
  <fo:inline-sequence font-size="10pt">...
<xsl:template match="AV">
  <fo:inline-sequence font-size="12pt">...
<xsl:template match="XS">
  <fo:inline-sequence font-size="4.2mm">...
<xsl:template match="DF">
  <fo:inline-sequence font-size="0.16inch">...
<xsl:template match="JR">
  <fo:inline-sequence font-size="0.16inch">...
<xsl:template match="WW">
  <fo:inline-sequence font-size="3.5mm">...
```

XSL FILE

FIG. 14

SCRAMBLING METHOD OF THE DATA FILES

BACKGROUND OF THE INVENTION

This invention relates to a data scrambler which can prevent a user of a receiver from executing reverse-engineering of received data files and/or from reusing them without the authority. For example, this invention can be applied to a system in which the receiver receives multiple kinds of data files and then processes them to obtain a processed output.

Various data management has been proposed in the art, and a suitable one of them is selectively utilized, corresponding to system environments, or the like. In one environment, it may be often undesirable to handle original data without any changes. In this case, the original data should be separated into a plurality of data files to be managed. In another environment, it is useful to separate original document data into their contents and their formats, and then, to manage them independently.

Such a plurality of data files can be independently transmitted, for example, through the Internet to the receiver or the operator, if management of the files and operation of them are carried out in different spaces from each other. On receiving the files, the receiver combines and processes them to obtain the processed output, like in a formatted document. Such file management provides easy operation to view one content in various formats, to watch various contents in one format, and to modify contents or formats without consideration of formats or contents.

However, if the transmitted data files remain in the original forms, someone may apply reverse-engineering of them and/or may reuse them in unauthorized ways. That is, someone may eavesdrop on the transmitted data files and may partially extract one of the contents from them. And furthermore, the extracted content may be changed into another format different from an original format to be sold to other persons. In such case, it is not easy for the distributor to recognize the cheating and the unauthorized practice, because of a difference between original and sold data formats.

To avoid the cheating and the unauthorized practice, encryption/decryption mechanism, such as the Secure Sockets Layer (SSL), are used in the conventional art. In this event, the transmitter transmits encrypted data files, while the receiver executes decryption to the transmitted data files.

However, this conventional approach has the following problems. Certainly, according to this approach, nobody can execute the undesired practice without the decryption code. It should be however noted here that the receiver always holds the decryption code, and therefore, the approach cannot prevent the transmitted data files from the unauthorized reuse of a user of the receiver. Furthermore, this approach requires a decryption apparatus in the receiver's side. Such requirement incurs a superfluous cost on the receiver's side. The tendency goes forward more and more, if the number of the receivers increases. Moreover, once the encryption method is decided in this approach, it is difficult to change the method, because the change requires not only new transmitter device but also new receiver device.

SUMMARY OF THE INVENTION

This invention therefore provide a scrambling method of data files which can prevent a user of a receiver from executing undesired practice of received data files. This scrambling method is quite different from the conventional techniques, but may be combined with the techniques.

According to one aspect of this invention, the following method of scrambling original data files into scrambled data files is obtained. On receiving such the scrambled data files, a destination node carries out predetermined processing of the scrambled data files.

The method comprises converting the original data files into converted data files different from the original data files, respectively. Specifically, the converted data files are selected or determined, such that the destination node obtains the same processed output when the converted data files are subjected to the predetermined processing. Therefore, the destination node, such as a receiver, does not need a specific arrangement to process only the converted data files, but does a processor capable of processing the original data files.

Such method further comprises transmitting the converted data files as the scrambled data files to the destination node. Herein, the converted data files may be directly transmitted as the scrambled data files. Prior to the transmitting, the converted data files may be further subjected to encryption.

BRIEF DESCRIPTION OF THE DRAWINGS

FIG. 7 shows a view for use in describing of another operation of an element order changer illustrated in FIG. 2;

FIG. 9 shows original XML and XSL files for use in describing of a chain of operations in the data scrambler illustrated in FIG. 2;

FIG. 10 shows XML and XSL files subjected to dummy insertion;

FIG. 11 shows XML and XSL files subjected to logical structure changing;

FIG. 12 shows XML and XSL files subjected to tag name changing;

FIG. 13 shows an XSL file subjected to element order changing;

FIG. 14 shows an XSL file subjected to value unit changing;

DESCRIPTION OF THE PREFERRED EMBODIMENTS

Figure 1:
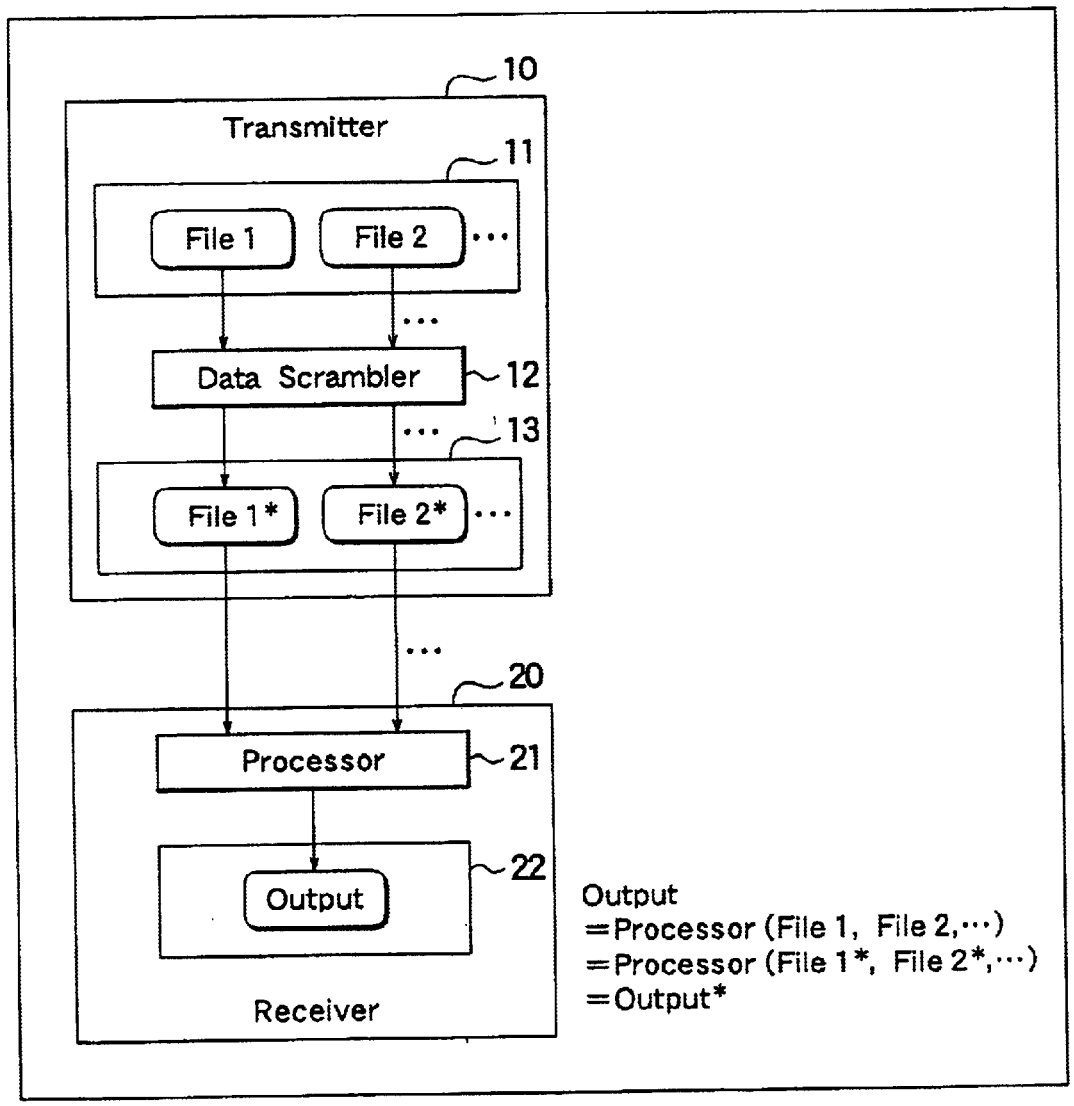
FIG. 1 shows a block diagram of a transmitter according to a preferred embodiment of this invention.

Prior to descriptions of embodiments of this invention, brief description of the conventional technique and of its problem will at first be made for a better understanding of this invention. Herein, the embodiments and the conventional technique both relate to handling an XML (extensible Markup Language) file and an XSL (extensible Stylesheet Language) file as data files. Furthermore, the each number of XML and XSL data files may be one, two, or more than two. Documents of such XML and XSL have been reviewed by W3C Members and, for example, are disclosed on the Web pages denoted by the following URLs:

http://www.w3.org/TR/REC-xml
    http://www.w3.org/TR/WD-xsl

These documents are incorporated herein by reference.

It is now assumed that a certain company runs a member system in which the company distributes, only among the members via communication network, real-time information of stock prices at the stock market. Specifically, in the assumption, the real-time information is distributed in the form of combination of an XML data file and an XSL data file.

According to conventional techniques, a distributed XML file with no encryption contains, for example, the following description:

```
<quote>
    <stock>
        <symbol>MSFT</symbol>
        <time>11:06AM</time>
        <price>94.25</price>
        <volume>6947600</volume>
    </stock>
    <stock>
        <symbol>DELL</symbol>
        <time>11:08AM</time>
        <price>48</price>
        <volume>4804900</volume>
    </stock>
    ...
</quote>
```

Such description has a simple data structure to understand what tags denote. Besides, once meanings of tags are understood, it is easy to describe a script and then to code the script into an executable program which cause a processor to partially extract the information about specific stocks from the above description, and then, to change them into another format information. Such information will be probably sold to other persons without authority.

Another assumption further makes us to grasp the problem of the conventional technique. This assumption relates to the telephone directory service which is provided on the Internet and teaches the telephone number in response to the input name of a person.

Herein, it is assumed that a user accesses the directory service through the Internet, and thereby, get the data having the followings:

```
<person>
    <FirstName>Yuzo</FirstName>
    <MiddleName></MiddleName>
    <LastName>Fujishima</LastName>
    <HomePhone>888-999-0000</HomePhone>
</person>
```

In this case, the user can readily make another database by utilizing the above data, and thereby, provide another directory service.

On the contrary, according to one aspect of the present invention, such unauthorized practice are prevented, because the distributed data are changed to differ from the original data, while the output obtained from the distributed data is unchanged.

Now, detailed explanations will be made about preferred embodiments of the present invention with reference to the drawings.

Referring to FIG. 1, a preferred embodiment relates to a source node for use in a communication system where a destination node belongs. Herein, the source node and the destination node may be also referred to as the transmitter 10 and the receiver 20 in this embodiment. In the system, the receiver 20 receives data files transmitted by the transmitter 10, and then, carries out predetermined processing of the received data files, for example, by using processor 21. The processor 21 has only a function capable of processing original data files, according to the embodiment. That is, even if target files of the processing are either ones of the original data files or the converted data files, the processor processes them with the function. Furthermore, the receiver 20 obtains a processed output, for example, on a display 22. Here, files mean logical aggregation of data and do not have to be physical ones.

The illustrated transmitter 10 comprises first and second memory devices 11, 13, and a data scrambler 12. The first memory device 11 memorizes a plurality of original data files, File 1, File 2, and so forth. The data scrambler 12 converts the plurality of the original data files, such as File 1 and File 2, into a plurality of converted data files, such as File 1* and File 2*. Herein, the converted data files, such as File 1* and File 2* are different from the original data files, such as File 1 and File 2, respectively. Besides, the data scrambler 12 selects or determines the converted data files, such that the same processed output is obtained when the receiver 20 carries out the same predetermined processing in connection with the plurality of the converted data files. These converted data files are memorized in the second memory device 13.

Specifically, the transmitter 10 directly transmits the converted data files (File 1*, File 2*, . . . ) into the receiver 20. Yet, the transmitter 10 may encrypt the converted data files prior to the transmission for the receiver 20.

Figure 2:
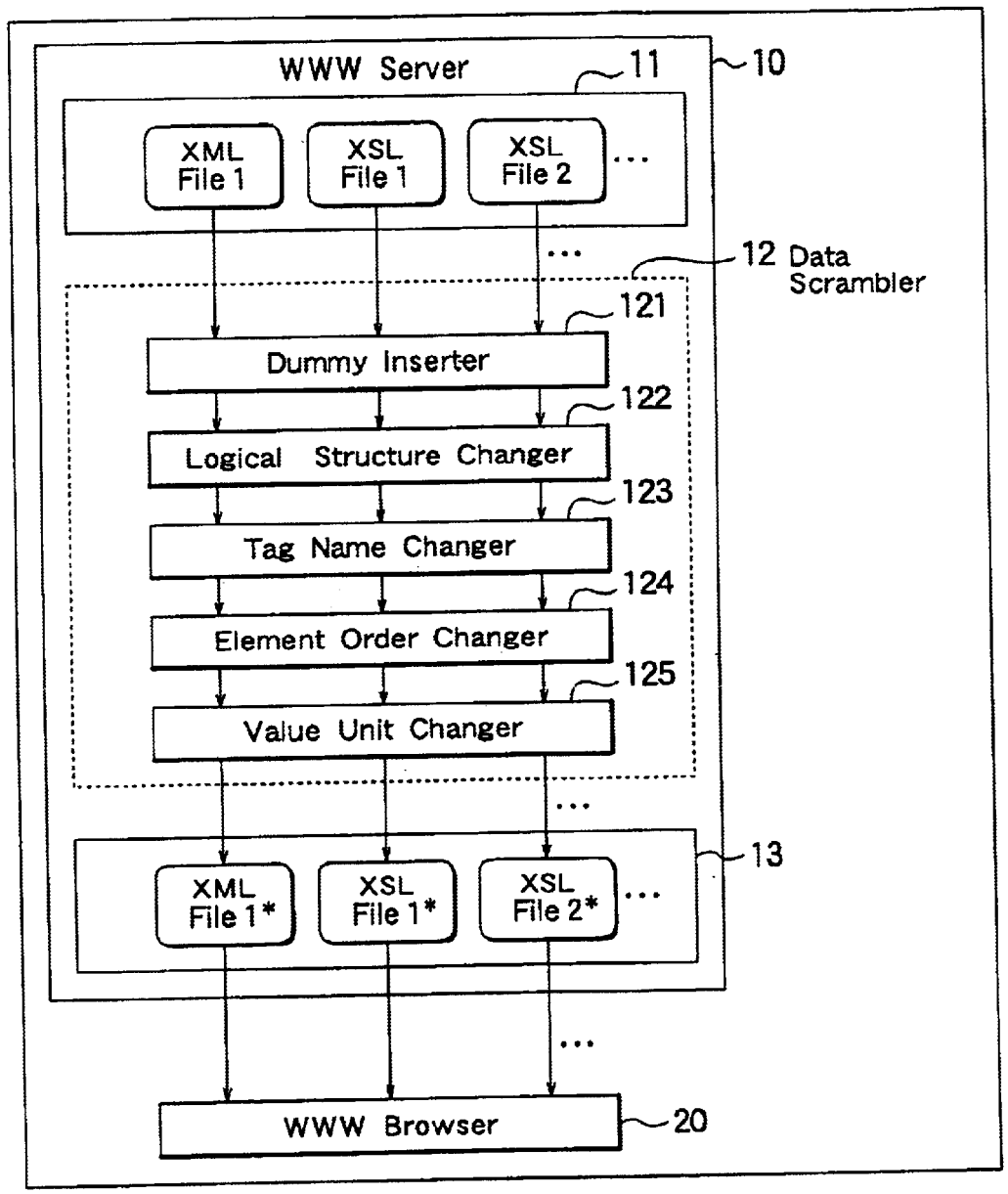
FIG. 2 shows a concrete structure of a data scrambler illustrated in FIG. 1, which is used in a WWW system.

Referring to FIG. 2, the source node and the destination node are WWW Server 10 and WWW Browser 20 both of which can handle XML (extensible Markup Language) files and XSL (extensible Stylesheet Language) files.

In the WWW Server 10, the data scrambler 12 comprises dummy inserter 121, logical structure changer 122, tag name changer 123, element order changer 124, and value unit changer 125. As described in later, the data scrambler 12 may comprise only one of combinations selected among the group of the above components and, besides that, the selected components may be arranged in any order. Thus, the descriptions of the components will be, hereinafter, independent of each other.

The dummy inserter 121 inserts dummy tags into an input XML file for the inserter 121, and furthermore, adds format instructions of the dummy tags into an input XSL file for the inserter 121. As the result, it is difficult to make a program to analyze the XML document with the help of the meanings of the tags.

Figure 3:
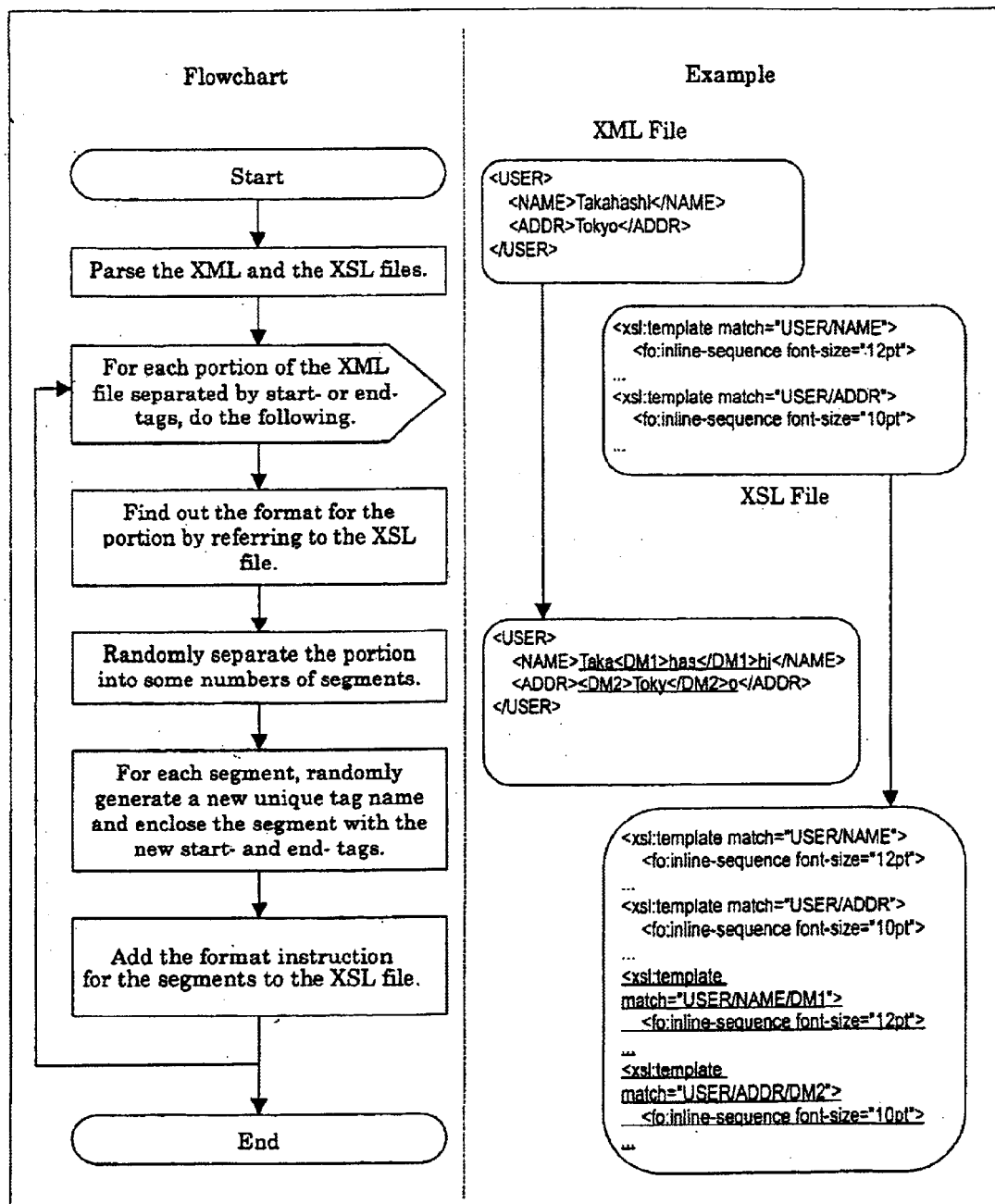
FIG. 3 is a flowchart defining an operation of a dummy inserter illustrated in FIG. 2, and an example corresponding to the flowchart.

In detail, the dummy inserter 121 handles the input XML file and the input XSL file, in the manner illustrated in FIG. 3. When receiving the input data files of XML and XSL, the dummy inserter 121 parses the XML and the XSL files, and then, executes the following dummy insertion for each portion of the XML file, which separated by start-tag and/or end-tag. That is, if a pair of start- and end-tags have no child element, the portion is the content between the pair tags and, on the other hand, the portion is the text between the start-tag and another start-tag or the text between another end-tag and the end-tag. Thus, the each portion includes no tag therein, in this embodiment, so that the XML document keeps nest structure thereof.

The dummy insertion comprises four steps, as shown in FIG. 3. At first, the dummy inserter 121 finds out the format instruction for the target portion, by referring to the XSL file. And then, the dummy inserter 121 randomly divides the target portion into predetermined numbers of segments. In the illustrated example, the portion "Takahashi" is divided into three segments, "Taka", "has", "hi", and also, another portion "Tokyo" is divided into two segments, "Toky" and "o."

After that, the dummy inserter 121 randomly generates new and unique tag name for the target segment. Herein, the tag name generation is repeatedly executed for the remaining segment, but need not be executed for all of the segments. When the tag name is generated, the dummy inserter 121 encloses the target segment with a pair of new start- and end-tags having the new tag name. In the illustrated example, the dummy inserter 121 generates a new tag name "DM1" for one target segment "has," and then, encloses the target segment "has" with new pair of start-tag "<DM1>" and end-tag "</DM 1>." In the same way, the dummy inserter 121 inserts new pair of start-tag "<DM2>" and end-tag "</DM2>" for another target portion "Tokyo."

On the other hand, the dummy inserter 121 adds, to the XSL file, the format instruction relating to the inserted tag name. In the illustrated example, the format instruction, which causes the font-size to be 12 points, is added into the XSL file in relative to the inserted tag name "DM1." Similarly, corresponding to the other inserted tag "DM2," the format instruction indicative of font-size="10 pt" is added into the XSL file.

The logical structure changer 122 changes logical structure of an input XML file for this changer 122, and furthermore, rewrites format instructions of an input XSL file for the changer 122 in relative to the change of the logical structure of the input XML file.

In detail, the illustrated logical structure changer 122 expands hierarchy of the logical structure of the XML file. That is, the logical structure changer 122 cause the tree structure of the XML file to be simple. Therefore, after the changing, it is difficult to make a program to analyze the XML document with the help of the tree structure. Herein, the change may be applied to the entire XML file, and also, to specific parts of the XML file.

Figure 4:
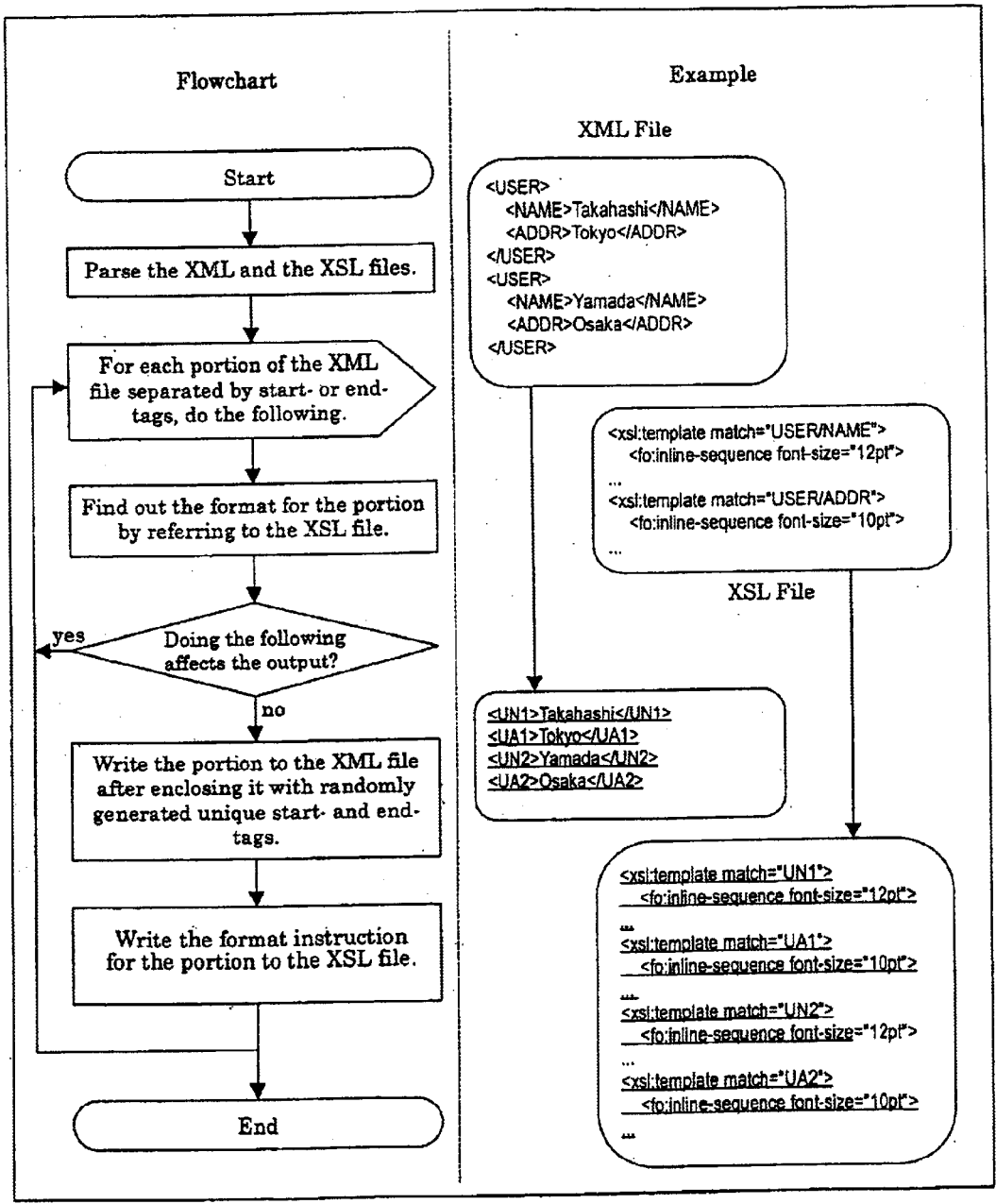
FIG. 4 is a flowchart and an example for use in describing of an operation of a logical structure changer shown in FIG. 2.

Such logical structure changer 122 processes the input XML file and the input XSL file, in the manner illustrated in FIG. 4. When receiving the input data files of XML and XSL, the logical structure changer 122 parses the XML and the XSL files, and then, executes the following structure changing for each portion of the XML file, which separated by start-tag and/or end-tag.

The processing of the logical structure changing comprises four steps illustrated in FIG. 4. At first, the logical structure changer 122 picks up the format instruction for the target portion, with reference to the XSL file. And then, the changer 122 judges whether the following two steps affect the output or not. As the result of the judgement, if the following two steps affect the output, then the changer 122 stops the processing for the current target portion and shifts to the processing for the next target portion.

On the other hand, if the judgement is "not," then the changer 122 randomly generates a unique pair of start- and end-tags, and encloses the target portion with the unique pair of tags to rewrite the XML file in accordance with the generated tags and the target portion. In the illustrated example, one unique pair of "<UN1>" and "</UN1>" are generated for one portion "Takahashi," while another unique pair of "<UA1>" and "</UA1>" are generated for another portion "Tokyo." Also, the remaining portions are processed similarly.

On the other hand, the logical structure changer 122 rewrites the format instruction of the target XSL file, in accordance with the change of the target portion and the unique pair of tags. In the illustrated example, the format instruction of indicative of font-size="12 pt" is written into the XSL file, in relative to the target portion enclosed by the unique pair of "<UN1>" and "</UN1>." Also, corresponding to the other pairs of tags, the other format instructions are rewritten into the XSL file. Such processing of the logical structure changing is repeatedly executed for other portions, but may not be executed for all of the portions. That is, the changer 122 may change the logical structure of the XML file partially.

The tag name changer 123 changes tag names included in an input XML file for this changer 123, and furthermore, rewrites format instructions of an input XSL file for the changer 123, in relative to the change of the tag names.

Figure 5:
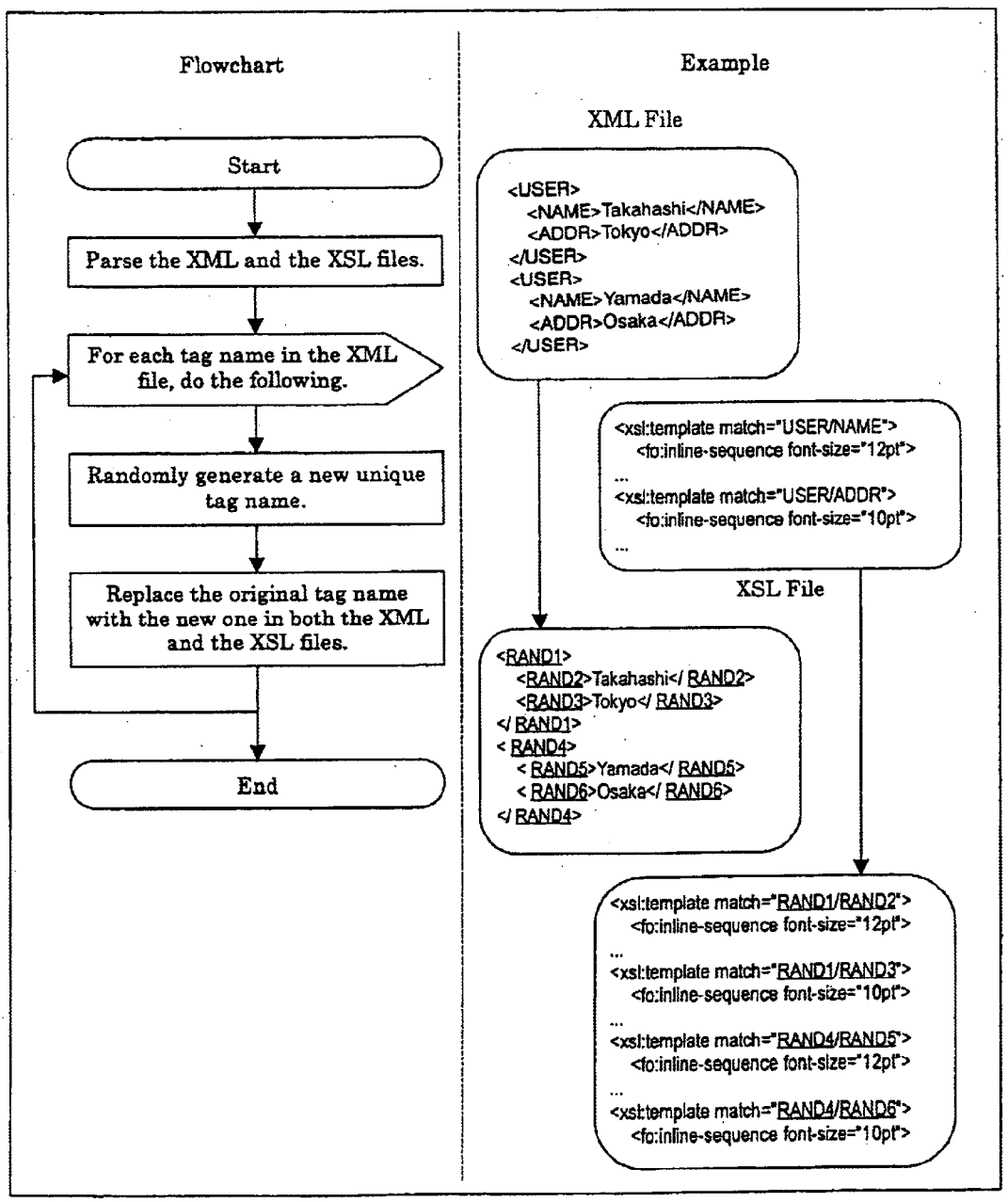
FIG. 5 shows a view for use in describing of an operation of a tag name changer illustrated in FIG. 2.

In detail, the tag name changer 123 operates according to the flowchart shown in FIG. 5. That is, when receiving the input data files of XML and XSL, the changer 123 at first parse the XML and the XSL files, and then, executes the following steps for each tag name included in the XML file. The tag name changing operation may be applied for one part of the XML file and, in this event, rewriting of the XSL file may be carried out in correspondence with only the changed tag name.

In this embodiment, the tag name changer 123 randomly generates new and unique tag name for the target tag name. And then, the changer 123 rewrites both the XML file and the XSL file to replace the target tag name with the generated tag name. In the example of FIG. 5, all tag names are replaced with "RAND1" through "RAND6." Such generated tag name has letters which are not rely on the content enclosed by the new tags, and thereby, it becomes difficult to analyze the XML document with the help of the tag names.

Figure 6:
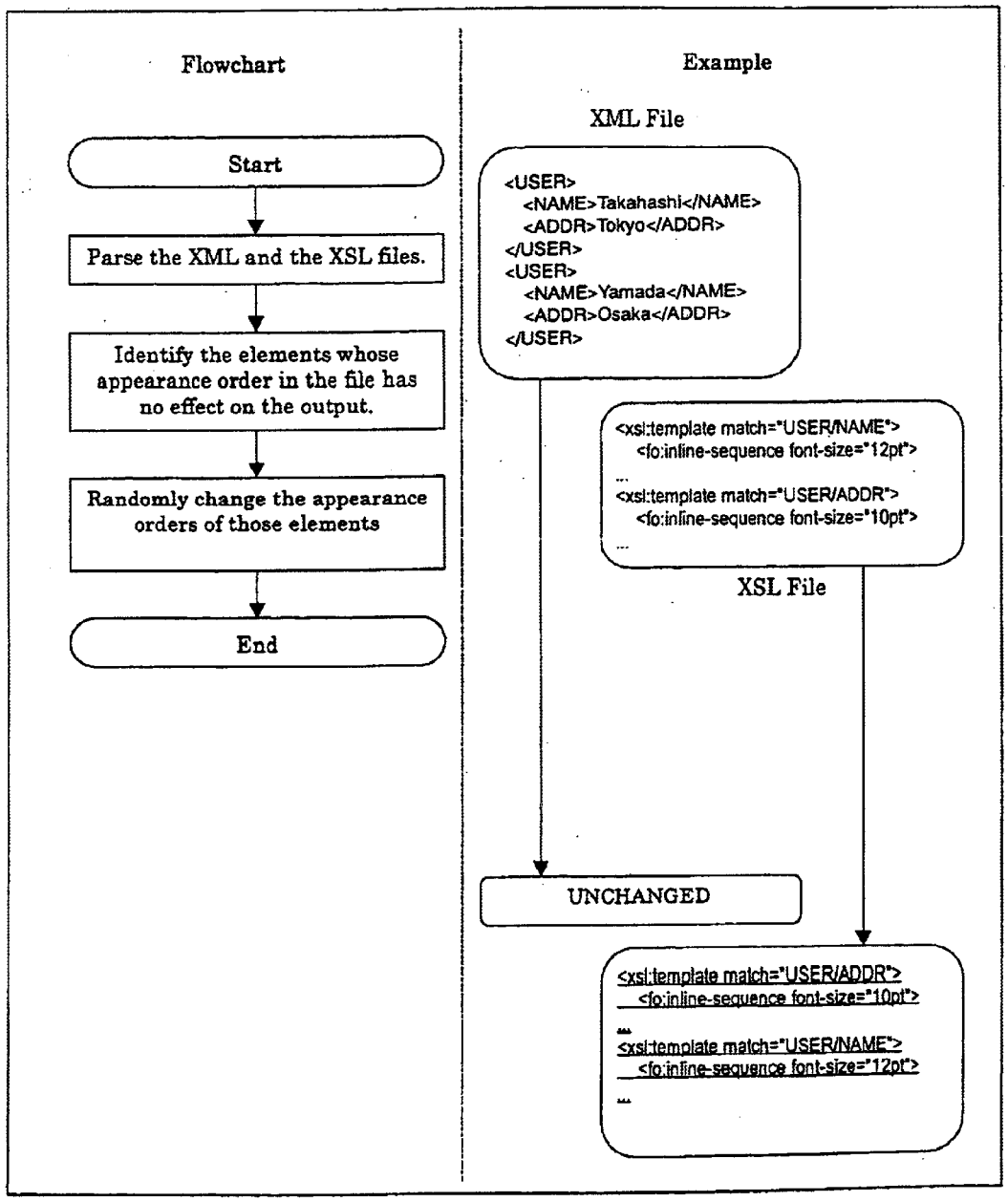
FIG. 6 shows a view for use in describing of an operation of an element order changer illustrated in FIG. 2.

Referring to FIG. 6, the element order changer 124 changes element order of an input XSL file for this changer 124. In this embodiment, the changer 124 does not process an input XML file for the changer 124, and therefore, the input XML file is kept unchanged.

In detail, when receiving the input data files of XML and XSL, the element order changer 124 parses the XML file and the XSL file, and then, identifies the elements whose order appearing in the file have no effect on the output. After that, the element order changer 124 randomly changes the orders of those elements. In the example of FIG. 6, the changer 124 replaces the format instructions of "USER/NAME" and "USER/ADDR" with each other.

Also, the element order changer 124 may change element order of the input XML file for this changer 124. The XSL document allows designating the order in which elements included in the XML file are displayed. For example, the XSL document may include the following request: if the element "USER" appears, display at first the child element "NAME", and then, display the child element "ADDR-."Such description of the XSL file is, for example, shown in FIG. 7. In this event, the obtained output does not rely on the appearance order of the elements "NAME" and "ADDR."

Thus, the changer 124 can change element order of the input XML file under the allowance of the description of the XSL file, but need not change it. For example, the changer 124 produces the changed XML file shown in FIG. 7, under the allowance of the above description of the XSL file.

Figure 8:
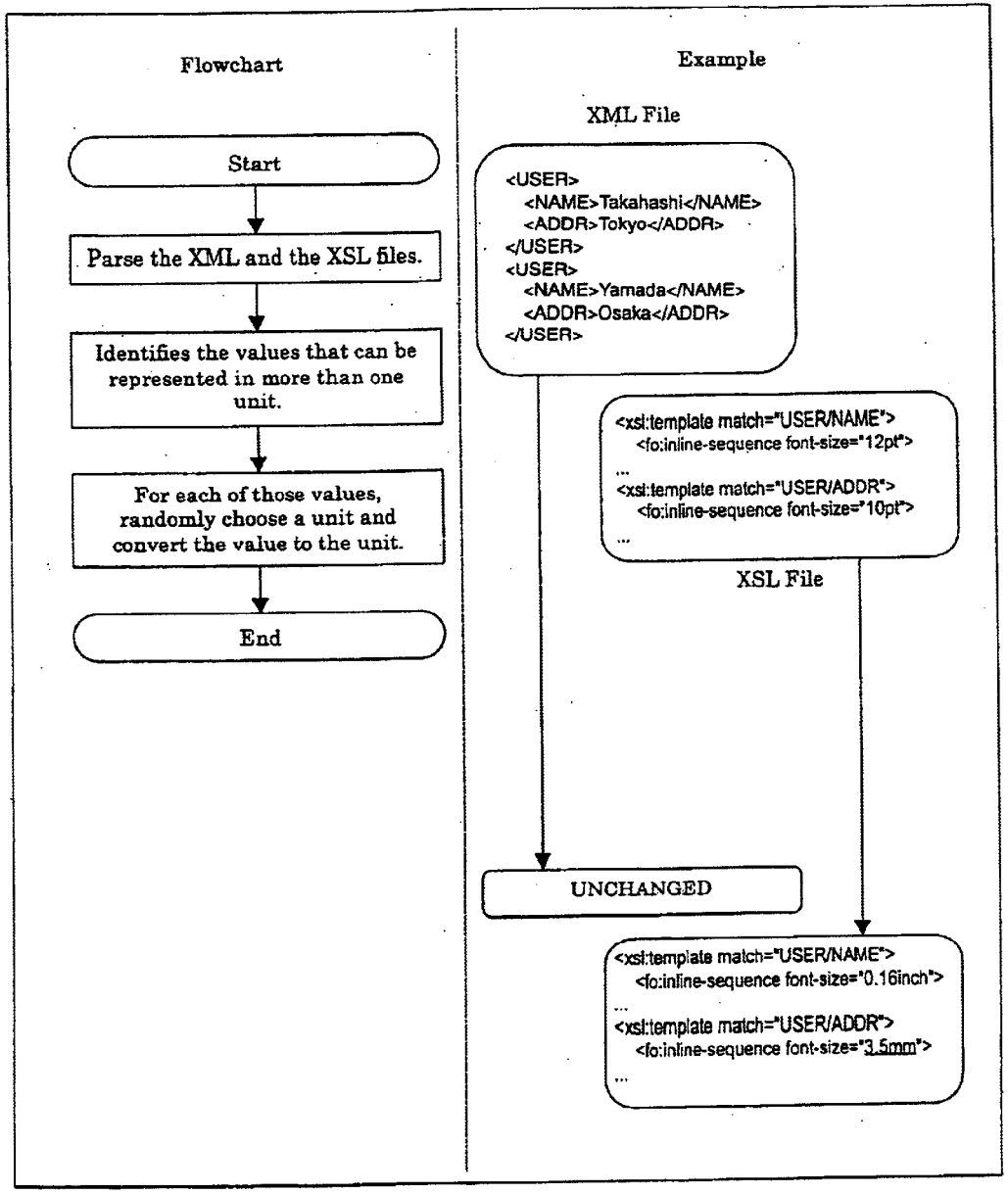
FIG. 8 is a flowchart and an example of an operation of a value unit changer shown in FIG. 2.

Referring to FIG. 8, the value unit changer 125 changes value and unit descriptions included in an input XSL file for this changer 125. Yet, the changer 125 does not process an input XML file for the changer 125, and therefore, the input XML file is kept unchanged.

In detail, when receiving the input data files of XML and XSL, the value unit changer 125 parses the XML file and the XSL file, and then, identifies the values which can be represented in another unit different from the current unit. After that, for each of those values, the value unit changer 125 randomly chooses a unit and converts the value to the unit. In the example of FIG. 8, the changer 125 changes descriptions "12 pt" and "10 pt" into "0.16 inch" and "3.5 mm," respectively.

The above descriptions are independently made about every component. Now, the explanation will be made about a chain of the operations of the components.

When the data scrambler 12 receives the XML and the XSL files illustrated in FIG. 9, the dummy inserter 121 inserts dummy tags "DM1" through "DM4" into the input XML file, as illustrated in FIG. 10. Furthermore, the dummy inserter 121 adds the format instruction about "USER/NAME/DM1", "USER/ADDR/DM2", "USER/NAME/DM3", and "USER/ADDR/DM4" into the XSL file, corresponding to the insertion of the above dummy tags.

The logical structure changer 122 receives the XML and XSL files outputted by the dummy inserter 121, and then, executes the logical structure changing for the received XML and XSL files to output new XML and XSL files illustrated in FIG. 11. Compared FIG. 11 with FIG. 10, the logical structure of the XML document is expanded and each tag has no child tag. Furthermore, the XSL file is rewritten in correspondence with the changed logical structure of the XML file.

The tag name changer 123 changes tag names of the XML file outputted by the logical structure changer 122 to produce new XML file shown in FIG. 12. Besides, the changer 123 rewrites description of the XSL file outputted by the logical structure changer 122, corresponding to the changed tag names. Herein, the rewritten description is also depicted in FIG. 12.

When receiving the XSL file outputted by the tag name changer 123, the element order changer 124 changes element order of the XSL file to produce new XSL file illustrated in FIG. 13.

Furthermore, the value unit changer 125 receives the XSL file produced by the element order changer 124, and then, changes value and unit description of the XSL file to produce new XSL file shown in FIG. 14. Herein, both the element order changer 124 and the value unit changer 125 do not change the XML file, and therefore, the XML file outputted from the value unit changer 125 is equal to the output XML file of the tag name changer 123, in this embodiment.

Figure 15:
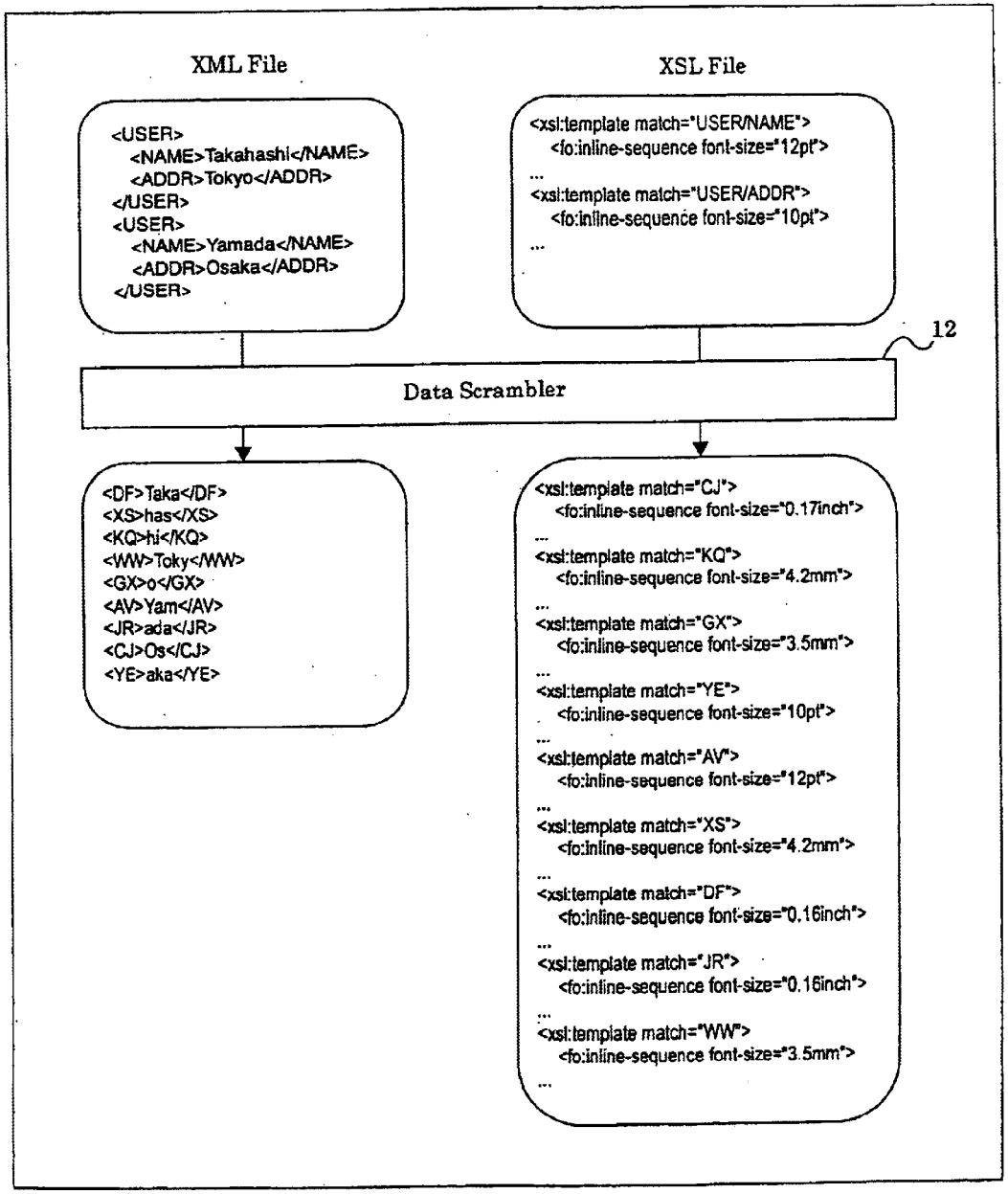
FIG. 15 shows the entire processing of the data scrambler.

The entire operation of the data scrambler 12 is shown in FIG. 15. Compared the original XML and XSL files with the converted XML and XSL files, the converted XML and XSL files are quite different from the original XML and XSL files. Therefore, it is much difficult to automatically analyze the converted XML and XSL files, and thereby, to extract the information included in the original XML and XSL files.

Thus, the data scrambler prevents the unauthorized reuse of the data files. Herein, if the distributor wants to authorize some users of receivers to reuse the distributed data files, the distributor may tell the users how to invert the conversion, for example, how to obtain file 1 from file 1*. Furthermore, for the converted data files, the processor 21 of the receiver 20 executes the same processing as the original data files. Therefore, no cost is incurred on the side of the receiver 21 to obtain the output. That is, no change requires at the receiver. It shows that changing the way of conversion is easy. Moreover, according to this embodiment, it is easy that the distributor authorizes some receivers to access to the original data files and, on the other hand, does not allow others to do.

While this invention has thus far been described in conjunction with a preferred embodiment thereof, it will now be readily possible for those skilled in the art to put this invention into various other manners. For example, the numbers of the transmitters and receivers may be arbitrary, and especially, each of them is not restricted to one.

Figure 16:
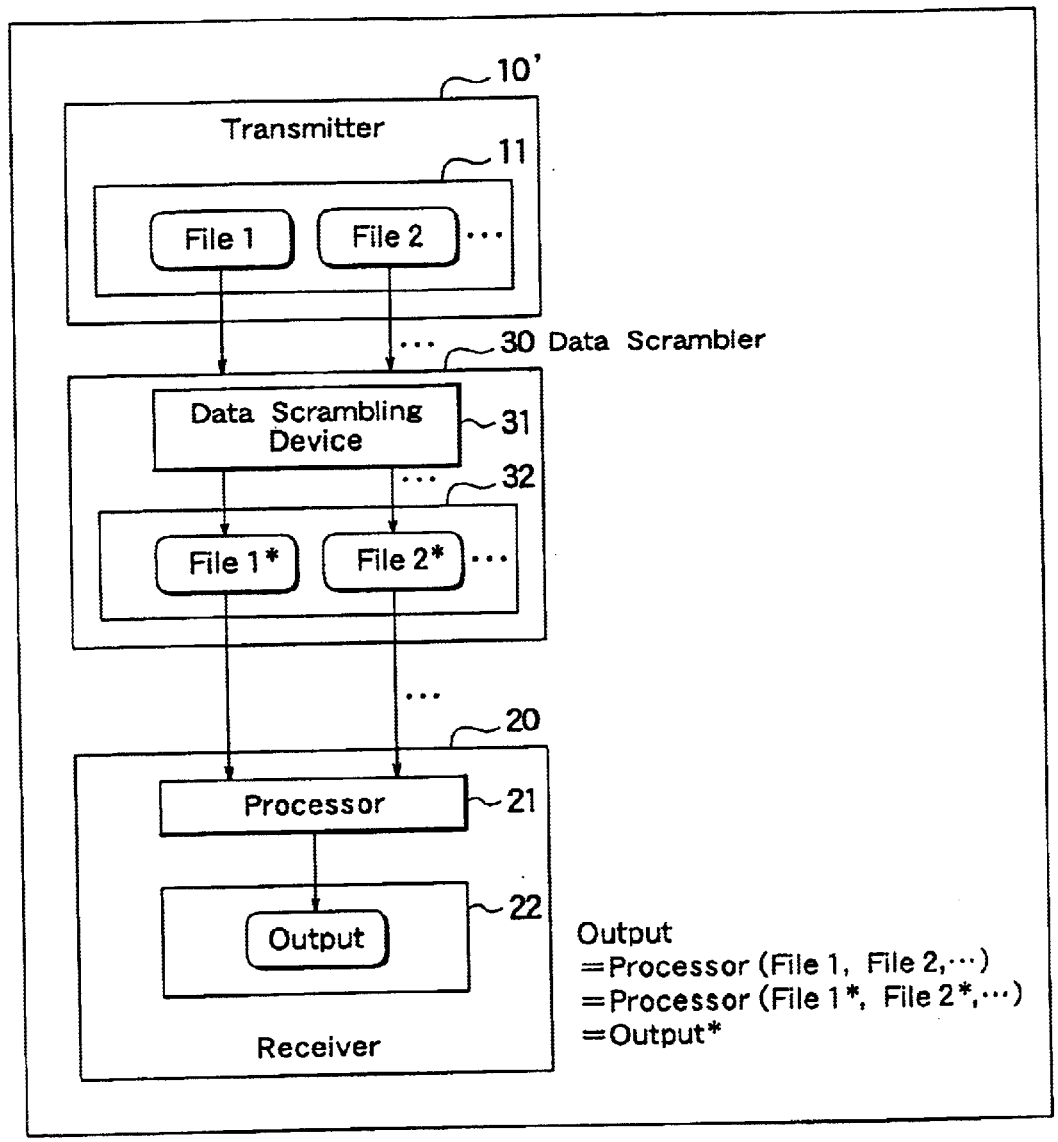
FIG. 16 shows another block diagram of a data scrambler according to another preferred embodiment of this invention.

The data scrambler does not have to be a part of the transmitter. As shown in FIG. 16, the transmitter 10' and the data scrambler 30 may be independent of each other. In this event, the data scrambling device 31 may have the same structure as the data scrambler 12 illustrated in FIG. 1, and the memory devices 11 and 32 are the same structures as the memory devices shown in FIG. 1. Such data scrambler 30 may work as a gateway of the transmitter 10'.

In the above explanation, the data scrambler 12 comprises five components. However, the numbers and the order of the components may be changed dynamically at each transmission processing.

Furthermore, the data scrambler may generate a common tag name for elements with identical format, instead of generating unique tags at every element. By doing that, the size of the converted files can be reduced, and the undesired practice becomes more difficult.

Moreover, this invention can be applied to any combination of document content description language and document format description language. That is, target files of the present invention are not limited to the combination of the XML and XSL files.

When small changes in the output of the receiver are acceptable, reverse-engineering or reusing can be made even more difficult, by changing the content of the data slightly, for example, by specifying different kinds of fonts at every transmissions. Such small changes in the output are also handled in the same manner of "no change in the output" case, in the present invention. That is, the description of "the same processed output" includes the meaning of "the processed output which is obtained from the converted data files and is slightly different from one of original data files," relating to the conversion executed in the data scrambler.

This invention may be in the forms of the computer program product and the computer data signal. In the former case, the data scrambling function is embodied in the combination of software modules. In this event, when executed by a processor, the software modules cause the processor to perform as the above-mentioned dummy inserter 121, logical structure changer 122, tag name changer 123, element order changer 124, and value unit changer 125. On the other hand, in the latter case, the data scrambling function is achieved as sequences of instructions transmitted on a carrier wave. In this event, when executed by a processor, the sequences of the instructions cause the processor to perform as the above-mentioned dummy inserter 121, logical structure changer 122, tag name changer 123, element order changer 124, and value unit changer 125.

What is claimed is:

1. A method for hindering reverse engineering of at least one original data file by scrambling said at least one original data file into at least one scrambled data file comprising the steps of:

utilizing a data processor located at a source node, converting the at least one original data file into at least one converted data file that is different from the at least one original data file by at least the addition of at least one dummy tag, said at least one converted data file being such that carrying out a predetermined processing of the converted data file generates an output that is the same as an output generated from carrying out the same predetermined processing of the original data file; and transmitting the converted data file as the scrambled data file to the destination node;

wherein attempts to reverse engineer said converted data file at said destination node are hindered as a result of said at least one converted data file being different from said at least one original data file.

2. The method claimed in claim 1, wherein the at least one converted data file is directly transmitted to said destination node.

3. The method claimed in claim 1, wherein both the at least one original data file and the at least one converted data file comprise at least one content data file which is described in a document content description language, and at least one format data file which is described in a document formal description language.

4. The method claimed in claim 3, wherein the content data file is an XML (eXtensible Markup Language) file and the format data file is an XSL (eXtensible Stylesheet Language) file.

5. The method claimed in claim 4, wherein the converting step includes at least one of the following steps (a)–(e) of:

(a) inserting said at least one dummy tag into the XML file and adding format instructions of the dummy tag to the XSL file;

(b) changing a logical structure of the XML file and rewriting format instructions of the XSL file according to the changed logical structure of the XML file;

(c) changing at least one tag name in the XML file and rewriting format instructions of the XSL file according to the changed tag name;

(d) changing an element order of the XSL file with the XML file kept unchanged; and (e) changing unit and value descriptions included in the XSL file with the XML file kept unchanged.

6. The method claimed in claim 4, wherein the converting step includes at least one of the following steps of:

inserting said at least one dummy tag into the XML file and adding format instructions of the dummy tag to the XSL file;

changing a logical structure of the XML file and rewriting format instructions of the XSL file according to the changed logical structure of the XML file;

changing at least one tag name in the XML file and rewriting format instructions of the XSL file according to the changed tag name;

changing a description of the XSL file concerning the order in which elements of the XML file are displayed, and rewriting the order of elements within the XML file according to the description of the XSL file; and changing unit and value descriptions included in the XSL file with the XML file kept unchanged.

7. The method claimed in claim 5, wherein:

the converting step comprises executing all of steps (a)–(e).

8. A source node for use in a system which hinders reverse engineering of a converted data file by a user at a destination node and in which the destination node receives the converted data file transmitted byte source node and then carries out a predetermined processing of the received, converted data file, said source node comprising:

a first memory for storing an original data file;

a data scrambler that converts the original data file into said converted data file, said converted data file being different from the original data file by at least the addition of at least one dummy tag for hindering reverse-engineering of said convened data file, wherein carrying out the predetermined processing of the converted data file generates an output that is the same as an output generated from carrying out the same predetermined processing of the original data file; and a second memory for storing the converted data file.

9. A source node claimed in claim 8, wherein both the original data file and the converted data file comprise content data files which are described in a document content description language, and format data files which are described in a document format description language.

10. A source node claimed in claim 9, wherein the content data file is an XML (eXtensible Markup Language) file and the format data file is an XSL (eXtensible Stylesheet Language) file.

11. A source node claimed in claim 10, wherein said data scrambler comprises at least one of the following first through fifth devices, the first device for inserting said at least one dummy tag into the XML file, and for adding format instructions of the dummy tag into the XSL file;

the second device for changing a logical structure of the XML file, and for rewriting format instructions of the XSL file according to the change of the logical structure of the XML file;

the third device for changing at least one tag name included in the XML file, and for rewriting format instructions of the XSL file according to the change of the tag name;

the fourth device for changing an element order of the XSL file, without changing the XML file; and the filth device for changing unit and value descriptions included in the XSL file, without changing the XML file.

12. A source node claimed in claim 10, wherein said data scrambler comprises at least one of the following first through fifth devices, the first device for inserting said at least one dummy tag into the XML file, and for adding formatting instructions of the dummy tag into the XSL file;

the second device for changing a logical structure of the XML file, and for rewriting formatting instructions of the XSL file according to the change of the logical structure of the XML file;

the third device for changing at least one tag name included in the XML file, and for rewriting formatting instructions of the XSL file according to the change of the tag name;

the fourth device for changing a description of the XSL file concerning the order in which elements of the XML file are displayed, and rewriting the order of elements within the XML file according to the description of the XSL file; and the fifth device for changing unit and value descriptions included in the XSL file, without changing the XML file.

13. A data scrambler comprising:

a data converter which converts an original data file to a converted data file the converter data file being different from the original data file by at least the addition of at least one dummy tag, said data converter positioned between a source node and a destination node for transmission of said converted data file from the source node to the destination node, wherein:

the destination node carries out a predetermined processing of the converted data file, wherein carrying out the predetermined processing of the converted data generates an output that is the same as an output generated from carrying out the same predetermined processing of the original data file, and wherein said convened data file hinders reverse engineering of said converted data file by virtue of said converted data file being different from said original data file.

14. The data scrambler claimed in claim 13, wherein both the original data file and the converted data file comprise at least one content data file which is described in a document content description language, and at least one format data file which is described in a document format description language.

15. The data scrambler claimed in claim 14, wherein the content data file is an XML (eXtensible Markup Language) file and the format data file is an XSL (eXtensible Stylesheet Language) file.

16. The data scrambler claimed in claim 15, wherein the data scrambler comprises at least one of the following first through fifth devices, the first device for inserting said at least one dummy tag into the XML file, and for adding format instructions of the dummy tag into the XSL file;

the second device for changing a logical structure of the XML file, and for rewriting format instructions of the XSL file according to the change of the logical structure of the XML file;

the third device for changing at least one tag name included in the XML file, and for rewriting format instructions of the XSL file according to the change of the tag name;

the fourth device for changing an element order of the XSL file, without changing the XML file; and the fifth device for changing unit and value descriptions included in the XSL file without changing the XML file.

17. The data scrambler claimed in claim 15, wherein the data scrambler comprises at least one of the following first through fifth devices, the first device for inserting said least one dummy tag into the XML file, and for adding format instructions of the dummy tag into the XSL file;

the second device for changing a logical structure of the XML file, and for rewriting format instructions of the XSL file according to the change of the logical structure of the XML file;

the third device for changing at least one tag name included in the XML file, and for rewriting format instructions of the XSL file according to the change of the tag name;

the fourth device for changing a description of the XSL file concerning the order in which elements of the XML file are displayed, and rewriting the order of elements within the XML file according to the description of the XSL file; and the fifth device for changing unit and value descriptions included in the XSL file without changing the XML file.

18. A computer program product comprising software modules which are executed by a processor to cause the processor to scramble at least one original data file comprising an XML (eXtensible Markup Language) file and an XSL (eXtensible Stylesheet Language) file, and then, to output at least one scrambled data file to be received by a receiver that performs a predetermined processing on the at least one scrambled data file, said software modules being executed by the processor and comprising at least one of the following first through fifth modules, the first module being operable to insert at least one dummy tag into the XML file, and to add format instructions of the dummy tag into the XSL file;

the second module being operable to change a logical structure of the XML file, and to rewrite format instructions of the XSL file according to the change of the logical structure of the XML file;

the third module being operable to change at least one tag name included in the XML file, and to rewrite format instructions of the XSL file according to the change of the tag name;

the fourth module being operable to change an element order of the XSL file without changing the XML file;

the fifth module being operable to change unit and value descriptions included in the XSL file without changing the XML file; and wherein the first through fifth modules only make changes to the at least one original data file such that the predetermined processing performed byte receiver on the scrambled data file produces an output that is the same as an output which would be produced if the receiver performed the predetermined processing on the original data file; and wherein a user at said receiver is hindered from reverse engineering the at least one scrambled data file.

19. A computer program product comprising software modules which are executed by a processor to cause the processor to scramble at least one original data file comprising an XML (eXtensible Markup Language) file and an XSL (eXtensible Stylesheet Language) file, and then, to output at least one scrambled data file to be received by a receiver that performs a predetermined processing on the at least one scrambled data file, said software modules being executed by the processor and comprising at least one of the following first through fifth modules, the first module being operable to insert at least one dummy tag into the XML file, and to add format instructions of the dummy tag into the XSL file;

the second module being operable to change a logical structure of the XML file, and to rewrite format instructions of the XSL file according to the change of the logical structure of the XML file;

the third module being operable to change at least one tag name included in the XML file, and to rewrite format instructions of the XSL file according to the change of the tag name;

the fourth module being operable to change a description of the XSL file concerning the order in which elements of the XML file are displayed, and to rewrite the order of elements within the XML file according to the description of the XSL file; and the fifth module being operable to change unit and value descriptions included in the XSL file, with the XML file kept unchanged; and wherein the first through fifth modules only make changes to the at least one original data file such that the predetermined processing performed by the receiver on the scrambled data file produces an output that is the same as an output which would be produced if the receiver performed the predetermined processing on the original data file; and wherein a user at said receiver is hindered from reverse engineering the at least one scrambled data file.

20. A method of converting at least one document written in a content description language and at least one document written in a format description language to transmit the converted documents to a destination node which receives the converted documents and then carries out a predetermined processing of the converted documents, the method comprising:

converting a fist document written in the content description language into a second document written in the content description language, the second document being different from the first document by at least the addition of at least one dummy tag;

converting a third document written in the formal description language into a fourth document written in the format description language, the fourth document being different from the third document, the third and fourth documents defining description formats of the first and second documents, respectively; and transmitting the second and fourth documents as the converted documents to the destination node;

wherein carrying out the predetermined processing of the convened documents generates an output that is the same as an output generated from carrying out the same predetermined processing of the first and third documents; and wherein a user at said destination node is hindered from reverse engineering the converted documents.

21. The method as recited in claim 20, wherein the content description language is eXtensible Markup Language (XML).

22. The method as recited in claim 20, wherein the format description language is eXtensible Stylesheet Language (XSL).

23. A method for hindering reverse engineering of at least one original data file by scrambling said at least one original data file into at least one scrambled data file comprising the steps of:

utilizing a data processor located at a source node, converting the at least one original data file into at least one converted data file that is different from the at least one original data file by at least the addition of at least one dummy tag, said at least one converted data file being such that carrying out a predetermined processing of the converted data file generates a display image that is substantially the same as a display image generated from carrying out the same predetermined processing of the original data file; and transmitting the converted data file as the scrambled data file to the destination node;

wherein attempts to reverse engineer said convened data file at said destination node are hindered as a result of said at least one converted data file being different from said at least one original data file.

24. A data scrambler comprising:

a data converter which converts an original data file to a converted data file, the converted data file being different from the original data file by at least the addition of at least one dummy tag, said data converter positioned between a source node and a destination node for transmission of said convened data file from the source node to the destination node, wherein:

the destination node carries out a predetermined processing of the convened data file, wherein carrying out the predetermined processing of the converted data generates a display image that is substantially the same as a display image generated from carrying out the same predetermined processing of the original data file, and wherein said convened data file hinders reverse engineering of said converted data file by virtue of said converted data file being different from said original data file.

25. A computer program product comprising software modules which are executed by a processor to cause the processor to scramble at least one original data file comprising an XML (eXtensible Markup Language) file and an XSL (eXtensible Stylesheet Language) file, and then, to output at least one scrambled data file to be received by a receiver that performs a predetermined processing on the at least one scrambled data file, said software modules being executed by the processor and comprising at least one of the following first through fifth modules, the first module being operable to insert at least one dummy tag into the XML file, and to add format instructions of the dummy tag into the XSL file;

the second module being operable to change a logical structure of the XML file, and to rewrite format instructions of the XSL file according to the change of the logical structure of the XML file;

the third module being operable to change at least one tag name included in the XML file, and to rewrite format instructions of the XSL file according to the change of the tag name;

the fourth module being operable to change an element order of the XSL file without changing the XML file;

the fifth module being operable to change unit and value descriptions included in the XSL file without changing the XML file; and wherein the first through fifth modules only make changes to the at least one original data file such that the predetermined processing performed by the receiver on the scrambled data file produces a display image that is substantially the same as a display image which would be produced if the receiver performed the predetermined processing on the original data file; and wherein a user at said receiver is hindered from reverse engineering the at least one scrambled data file.

* * * * *